Dec. 9, 1941.  B. A. OLIVER  2,265,573
CHECKROW WIRE ANCHOR
Filed April 2, 1940
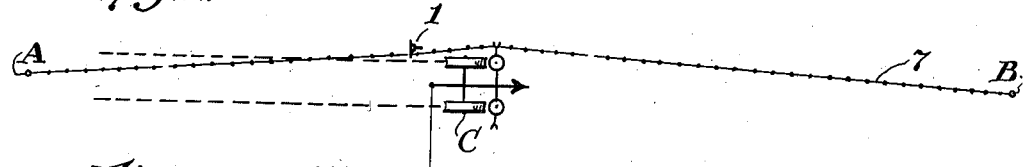
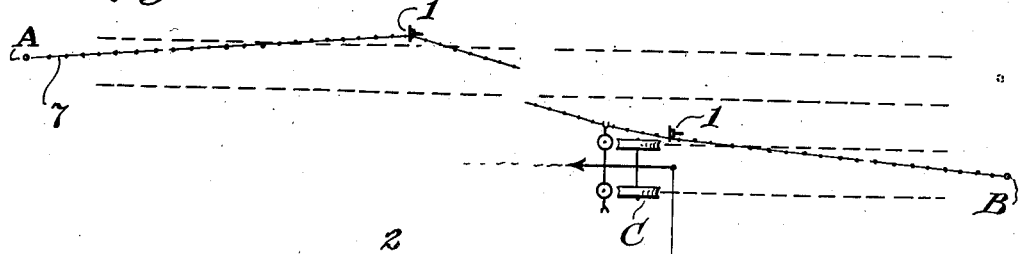
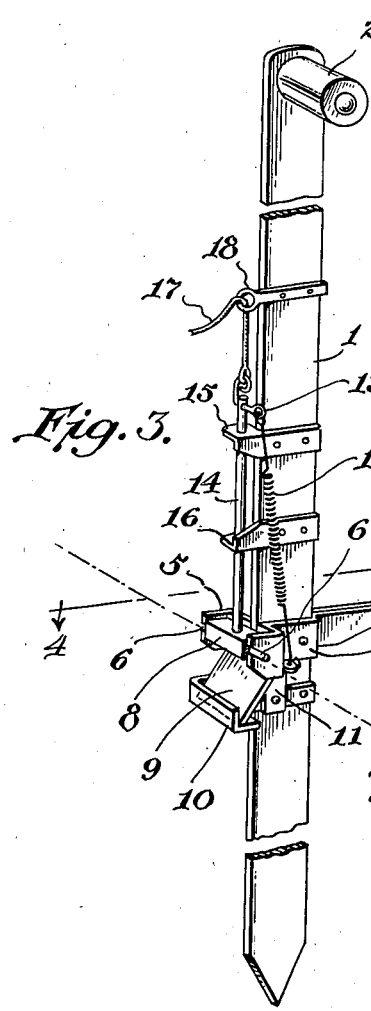
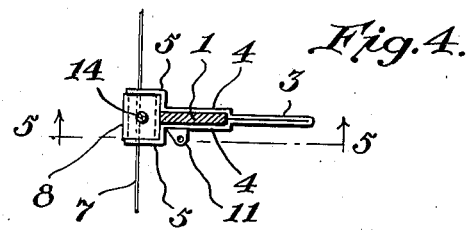
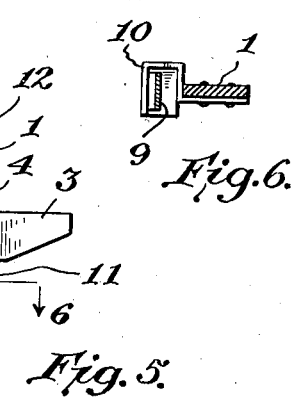
Inventor
Benton A. Oliver
By Eccleston & Eccleston,
Attorneys

Patented Dec. 9, 1941

2,265,573

UNITED STATES PATENT OFFICE 2,265,573

CHECKROW WIRE ANCHOR

Benton A. Oliver, Bloomington, Ind.

Application April 2, 1940, Serial No. 327,516

4 Claims. (Cl. 111—49)

This invention relates to grain planters and particularly to check row planters where a wire is stretched across the field and serves to operate a feeding mechanism on the planter to cause the seeds to be dropped at regularly spaced intervals.

Check row wires when in operation extend diagonally across the field from the end of one row to the opposite end of an adjacent row. The opposite ends of the wire are alternately shifted, as the seeding of the field progresses, by the operator as he reaches the opposite ends of the field from time to time.

The diagonal arrangement of the wire requires that a certain amount of slack be provided in order that the planter can reach the end of the field without breaking the wire or otherwise disrupting operations. Obviously however the presence of slack in the wire tends to prevent uniformity in the placement of the hills, and this is particularly true on hilly or rolling fields; also on fields containing corn stubble or other projections with which the wire may entangle.

Accordingly it is an object of the present invention to provide a method of supporting the check row wire so as to avoid excessive slack therein and thereby overcome the above-mentioned objections to the usual method of operation.

Another object of the invention resides in the provision of a novel check row wire anchor adapted to be used intermediate the ends of the row and serving to releasably hold the wire until such time as it is released by the operator.

Other objects and advantages of the invention will be apparent from the following description when taken in connection with the accompanying drawing, in which, Figures 1 and 2 are diagrammatic views showing the method of operating a planter with the intermediate anchors in use.

Figure 3 is a perspective view of one of the intermediate anchors.

Figure 4 is a horizontal sectional view through one of the anchors, taken on line 4—4 of Figure 3.

Figure 5 is a fragmentary sectional view taken on line 5—5 of Figure 4, and

Figure 6 is a horizontal sectional view taken on line 6—6 of Figure 5.

Referring to the drawing in more detail and particularly to Figures 3 to 6 inclusive, the numeral 1 indicates a stake preferably formed of metal and provided with a sharpened lower end for entrance into the ground. The upper end of the stake is provided with a handle 2 to facilitate handling the stake, and a bracket 3 is rigidly secured to the stake adjacent its lower end to serve as an abutment on which the operator places his foot when forcing the stake into the ground.

The bracket 3 includes side members 4 which engage the flat sides of the stake and are riveted or otherwise secured thereto. The plates or side members 4 are provided with L-shaped extensions 5 cooperating to form guideways for a latch and the ends of the L-shaped members are provided with downwardly inclined slots 6 in which an intermediate section of a check wire 7 may be positioned as indicated in Figures 3, 4 and 5.

The latch for releasably holding the wire within the slots 6 comprises a hook-shaped member 8, having a down-turned portion which is adapted to engage over the slots 6 and hold the wire 7 locked therein so long as the latch is in locking position. The width of the latch is substantially equal to the space between the extensions 5 which form a guide for the latch, and the lower end of the latch is provided with an outwardly inclined extension 9 which normally rests on a stop member 10. The stop member 10 is in the form of a pocket for receiving the extension 9 of the latch, and is fixedly secured to stake 1 by rivets or the like.

A bracket or other attaching means 11 is fixedly secured to the stake 1 and provides a means for connecting one end of a coil spring 12. The opposite or upper end of the spring 12 is connected to an eye member 13 formed on a rod 14 which is in turn secured to the upper end of the latch member 8. The rod 14 is slidably mounted in guide brackets 15 and 16, and may be raised against the tension of spring 12 by means of a rope or the like 17 passing through an eye 18 secured to the stake above the bracket 15.

From the above detailed description of the anchor for the check row wire it will be apparent that the wire may be readily positioned in the slots 6 by a lateral movement of the wire preferably after the stake is forced into the ground at the desired point. Of course the latch 8 must be raised in order to insert the wire, and upon release of the latch it is automatically brought to locking position by means of the spring 12.

The method employed in using the intermediate anchors for the check row wire will now be described.

In Figure 1 the check row wire is shown in its original position at the beginning of operations with the end anchors A and B at the opposite ends of a row to be planted. When the planter C reaches a point adjacent the middle of the field it is stopped and the operator inserts one of the intermediate anchors 1 in position directly behind the machine and secures the wire thereto by means of the notches 6 and latch 8 as heretofore described. Thereafter the planting is continued on to the end of the field. As is usual in planting by check row wires the end anchor B is then moved over the desired distance, as shown in Figure 2, and the planter is started toward the opposite end of the field at which the end anchor A is located.

As the planter approaches the intermediate anchor 1, possibly thirty hills therefrom, the planter is again stopped and another intermediate anchor 1 is positioned in the ground behind the planter, and the wire is released from the intermediate anchor by operating the rope 17. The planter is then continued on to the end of the field. Thereafter the end anchor A is advanced in the usual manner and the operations repeated until the entire field is planted.

By use of this method of planting with intermediate anchors for the check row wire a more uniform placing of the hills is provided due to the fact that improper movement of the wire is greatly reduced by reason of the fact that the wire is always locked to an intermediate anchor adjacent the middle of the field. This method of operation therefore is especially adaptable to hilly or rolling fields or to fields in which the presence of corn stubble will interfere with the proper functioning of the wire. It is also useful for the novice in that it eliminates the hit or miss procedure involved in merely shifting the end anchors as is the common practice.

In accordance with the patent statutes I have described the preferred form of the invention and the method employed therewith but inasmuch as various changes may be made in the details of construction and operation it is intended that such changes be included within the scope of the appended claims.

What I claim is:

1. An anchor for check row wires comprising a stake, a bracket secured to the stake and provided with a wire-receiving slot, a latch for cooperation with the slot, brackets positioned above and below the first-mentioned bracket, the upper bracket having an aperture therein, a rope threaded through the aperture and secured to the latch for operating the same in one direction, and an extension on the lower bracket to serve as a stop to limit the movement of the latch in one direction.

2. An anchor for check row wires comprising a stake, a bracket secured to the stake and provided with a wire-receiving slot, a latch for cooperation with said slot, a rod secured to said latch, a pair of guide brackets in which said rod is slidably mounted, and means for operating said rod.

3. An anchor for check row wires comprising a stake, a bracket secured to said stake, spaced parallel plates extending from said bracket and provided with wire-receiving slots, and a latch slidably mounted between said plates and adapted to close the open ends of said slots.

4. An anchor for check row wires comprising a stake, a bracket secured to said stake, spaced parallel plates extending from said bracket and provided with wire-receiving slots, a latch slidably mounted between said plates and adapted to close the open ends of said slots, and a spring for normally moving the latch to slot-closing position.

BENTON A. OLIVER.